May 9, 1967          E. PAULING          3,318,662
SULFUR DIOXIDE SEPARATION
Filed June 16, 1965
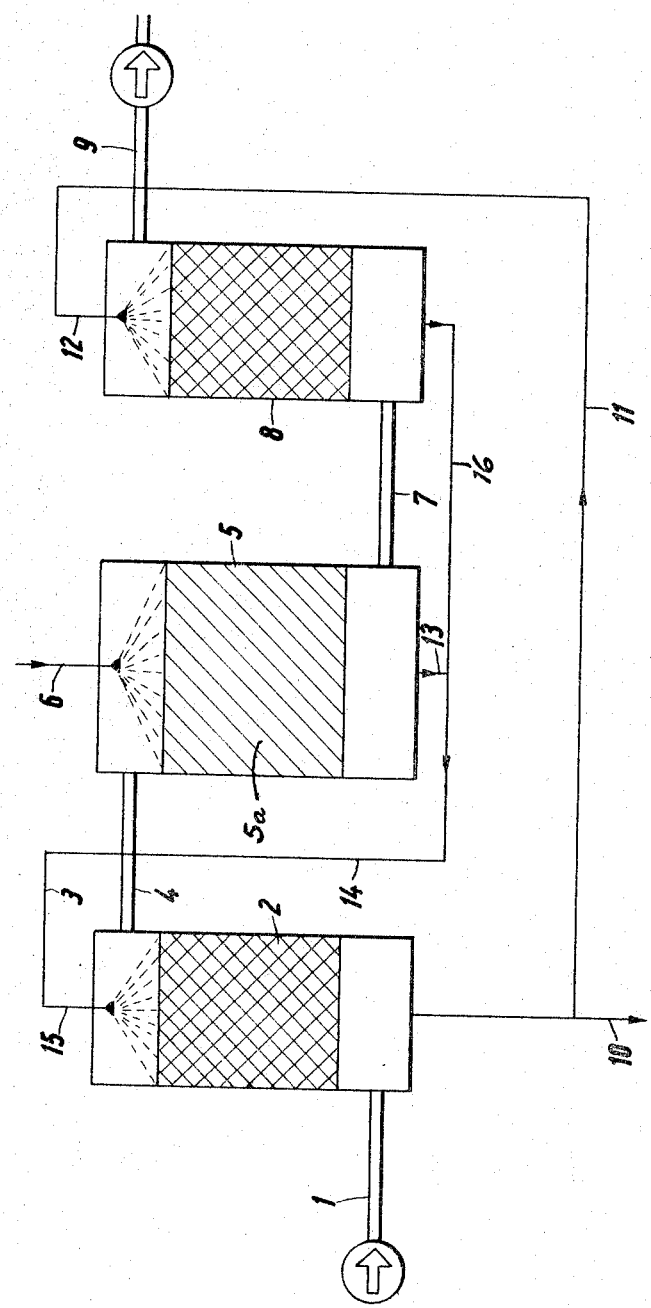
Inventor:
Egon Pauling
By Bailey, Stephens & Huettig
ATTORNEYS

United States Patent Office 3,318,662
Patented May 9, 1967

3,318,662
SULFUR DIOXIDE SEPARATION
Egon Pauling, Essen, Germany, assignor to Metallgesellschaft Aktiengesellschaft, Frankfurt am Main, Germany
Filed June 16, 1965, Ser. No. 464,472
Claims priority, application Germany, Oct. 17, 1960, P 25,857
10 Claims. (Cl. 23—168)

This application is a continuation-in-part of application Ser. No. 142,782, filed Oct. 5, 1961, now abandoned.

The present invention relates to a low temperature catalytic process for treating sulfur dioxide containing gases in the presence of oxygen, water and a carbonaceous adsorbent or absorbent containing an effective catalytic amount of what was formerly thought to be a poisoning impurity.

It is known that active carbon can catalyze the conversion of $SO_2$ in the presence of oxygen and water to sulfuric acid in a relatively low temperature catalytic process, e.g., at temperatures below about 100° C. This catalytic process is also effective with very low concentrations of $SO_2$, e.g., concentrations of 0.2% and less. Other conventional processes for treating $SO_2$ containing gases are not effective when such low concentrations of $SO_2$ are present in the starting gases.

It has been suggested that the carbon be saturated or loaded first with $SO_2$, then with oxygen and finally to form sulfuric acid by subsequent addition of water with extraction of the sulfuric acid with water. German Patent 854,205 discloses a process wherein these various operations are carried out concurrently. That is, sulfuric acid is formed by a process in which water or dilute sulfuric acid is continuously sprinkled or trickled over the active carbon in contact with gases containing $SO_2$ and oxygen.

These known processes have a basic disadvantage. While the initial catalytic activity or effectiveness of the active carbon in these processes may be good, this catalytic activity soon falls below economically satisfactory limits within a short time, e.g., after only a few days of operation.

It was taught in the prior art, in U.S. Patent 1,744,735, that the oxidation of $SO_2$ is prevented or greatly lessened by the presence of small quantites of tin compounds, such as stannous chloride, sulphate, hydroxide or tetrachloride, in the active carbon.

It was found, however, that the rapid drop in catalytic activity was not caused by "poisoning" of the catalyst with what were thought to be poisoning impurities such as occurs in other catalytic processes. It was therefore initially concluded that the active carbon was in some way affected chemically by low temperature oxidation or combustion.

It was surprisingly found that the catalytic effectiveness or activity of the carbonaceous substances was due only in part to its surface characteristics or properties. It was found that a large part of its catalytic activity depends on the intermediate or intervening effect of relatively small amounts of catalytically effective elements in or on the carbonaceous substance which alone in such small amounts show very little catalytic effect. These elements which very significantly increase the activity of the carbonaceous substance are normally present in or on the carbonaceous substance at the beginning in amounts of about 10 to 200 grams/metric ton which is sufficient to provide good initial catalytic activity. However, after a relatively short time these catalytically effective elements are removed from the carbonaceous substance in the normal course of the processes employed heretofore typically by being washed out or extracted with the sulfuric acid formed. The activity of the carbonaceous substance accordingly drops very sharply, i.e., drops to about 40% or lower of its initial activity.

The elements which very sharply increase the activity of the carbonaceous substance in catalyzing the reaction

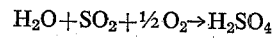

$$H_2O + SO_2 + \tfrac{1}{2}O_2 \rightarrow H_2SO_4$$

by their presence in or on the carbonaceous substance according to the invention are metals as manganese, copper, gold, platinum, titanium, iron, zinc, nickel and cobalt and/or metalloids as arsenic, chromium, vanadium, molybdenum, tin and their oxides. The non-metal iodine has a special activity increasing effect and is a preferred element to be present. An essential feature of the process of the invention is that the amount of activity increasing element present in or on the carbonaceous substance is not permitted to fall below the limit which affords catalytic activity. That is, the amount of activity increasing element is maintained during the process within concentration limits per metric ton of carbon which produce the desired catalytic effect, i.e., the catalytic level. These concentration limits and the method of maintaining the elements within these limits depend on the element, combination of elements or their compounds employed. Where the activating elements on their compounds are soluble in sulfuric acid, as applies to, for example, copper, arsenic, titanium, iron and to some degree also for iodine, the elements or their compounds must be added or supplied to the carbonaceous substance continuously or from time to time to keep the concentration within satisfactory limits. To achieve the desired activating effect, typically the amount is maintained at about a level equal to 5 to 500 preferably 50 to 100 grams per cubic meter of diluted acid taken off or produced. Thus when a sulfuric acid soluble activating element or compound is employed, the amount of such element or compound is preferably maintained at about 100 to 5000 grams per metric ton of carbon adsorbent present. Employing elemental iodine which is preferred the amount of iodine in contact with the carbon adsorbent during the process is maintained at 0.1 to 5% by weight of carbon adsorbent.

The invention therefore comprises a low temperature or cold catalytic process for separating sulfur dioxide from a starting gas containing a minor proportion, e.g., up to about 5–8% sulfur, suitably about 0.1% to 5% $SO_2$, by contacting the starting gas with oxygen and water in the presence of a catalyst composition comprising a carbonaceous adsorbent containing a catalytic amount of an element or member selected from the group consisting of manganese, copper, titanium, iron, zinc, nickel, cobalt, tin, arsenic, chromium, vanadium, molybdenum and iodine, maintaining the concentration of the element or member at a catalytic level and separating the sulfuric acid formed.

The $SO_2$ content of the starting gas using the process of the invention may typically be reduced from about 100–20,000 p.p.m. to less than about 1–5 p.p.m. The product gas may then be collected, cycled to other systems or exhausted to the atmosphere. Each combination of catalytic element and adsorbent has a so-called critical charge or threshold value of $SO_2$ up to which essentially all of the $SO_2$ in the starting gas can be removed, i.e., up to which the product gas is substantially free of $SO_2$. Free of $SO_2$ in this sense is intended to mean an $SO_2$ content which is not detectable with iodine and at least below about 0.2 mg./m³.

The adsorbent employed is preferably a carbonaceous substance. Examples of suitable adsorbents are low temperature carbonization materials, active carbon and charred carbonaceous materials. In general the adsorbents employed in the process should have the following characteristics:

(1) Good chemical resistance to all the reactants, and
(2) Good adsorption power for $SO_2$ and $O_2$ as well as for the aforementioned activity increasing additives, in the presence of water.

The best combination of adsorbent to be used with the activity increasing material contained thereon or added thereto is determined by the operating conditions and result to be achieved. If $SO_2$ containing gas which contains the activity increasing materials in dust form is to be used as the starting gas, then it is suitable to feed this gas, without a preliminary dust removal step, directly into the cold catalysis system. Thereby the metals or activating compounds contained in the dust are used to maintain or increase the activity of the previously impregnated adsorbent used. This provides a further advantage in that a dust removal step necessary heretofore can be omitted. However, it is also possible to separate the dust from the starting gas before addition of the gas to the cold catalysis system, if this is desirable on certain operational grounds, and add the separated dust to the cold catalysis system separately. This embodiment of the invention is especially suitable for removing $SO_2$ from flue gas from mineral oil burners, since this flue gas is normally rich in vanadium. It is also especially suitable for treating exhaust gas which contains mostly copper, nickel and arsenic from metal smelting furnaces, as well as for treating exhaust gas from iron ore sintering plants which contains iron, manganese and zinc.

The temperature at which the catalytic process is carried out is typically below about 100° C., e.g., between about 20° and 80° C., and preferably between about 40 and 70° C. "Low temperature" or "cold" as employed herein is intended to refer to such temperatures. As is known an increase in temperature at which a reaction is carried out has the effect generally of accelerating the reaction.

Regarding temperature of the catalysis, the temperature of the starting gas, e.g., flue gases or exhaust gases from metal smelting furnaces or iron ore sintering plants, is often considerably higher than about 40–70° C., i.e., the most economical temperature for separating $SO_2$ according to the process of the invention. Also the humidity, or water content of such gases is lower than that required for optimum conversion of $SO_2$. Accordingly, one embodiment of the invention comprises cooling and humidifying the starting $SO_2$ containing gas by first directly contacting it with dilute $H_2SO_4$ thereby lowering the temperature and raising the humidity or water content to optimum levels. A dilute $H_2SO_4$ which is readily available for this purpose is that produced in the catalytic stage of the process. A relatively concentrated and hot $H_2SO_4$ is obtained from this pretreatment step which can be used for drying and reheating the exhaust gases which leave the catalyst stage after $SO_2$ removal. According to this embodiment of the invention the $SO_2$ containing starting gas at a temperature higher than about 120° C., e.g., 140–250° C., is intimately contacted directly in a first stage with dilute $H_2SO_4$ thereby cooling the gas to a temperature of about 40 to 100° C., preferably about 40 to 70° C., and also thereby humidifying it; thereafter in a second stage contacting the gas resulting from the first stage with a catalyst comprising a catalytic element maintained in or on a carbonaceous adsorbent at a catalytically effective amount, e.g., 5 to 1000 grams/metric ton of carbon adsorbent in the case of iodine or 0.1 to 5 wt. percent in the case of iodine in the presence of water and oxygen, thereby converting the $SO_2$ present to $H_2SO_4$; and in a third stage contacting the gas resulting from the second stage with hot concentrated $H_2SO_4$ resulting from the first stage, thereby drying and heating the gas resulting from the second stage. The product gas resulting from the third stage may then be exhausted to the atmosphere. Such product gases not only satisfy health standards with regard to $SO_2$ content, but also do not sink near the exhaust stack and cause dangerous contamination of the surrounding area.

As stated, the catalyst element or compound may be impregnated or incorporated, wholly or partially, in the adsorbent in the course of manufacture of the adsorbent. This is particularly advisable in a case in which the adsorbent does not readily adsorb or take up the catalytic element or compound. If the catalytic element or compound is present in the reaction system in which the adsorbent is being prepared, the lattice or structure of the adsorbent is modified in such a manner that, after the catalyst has been extracted or washed out of the adsorbent during the normal process of treating the $SO_2$ containing gas, the adsorbent can readily be recharged with the catalytic element or compound by adsorption.

Several other factors in addition to temperature of the catalysis influence the efficiency and course of separating $SO_2$ from the starting gas. These include the concentration of sulfuric acid in contact with the adsorbent and catalytic element, the grain size of the adsorbent, the concentration of the reactants and the extraction of sulfuric acid with water from the catalyst-adsorbent system.

The concentration of sulfuric acid formed in contact with the adsorbent is significant. Firstly, solubility of the reactant gases declines with rising acid content and accordingly rising acid content has the same effect as decreasing $SO_2$ concentration. Secondly, the amount of sulfuric acid adsorbed increases with rising concentration thereby retarding diffusion of the reactant gases to the adsorbent. Thirdly, rising sulfuric acid concentration reduces the quantity of catalytic element or compound adsorbed on the adsorbent. Retardation of reaction velocity is not in general significant up to a sulfuric acid concentration of about 35% when operating under otherwise suitable reaction conditions. It is however preferred to maintain the concentration of the acid running off the adsorbent at about 10% $H_2SO_4$. After the concentration of sulfuric acid reaches about 35% the reaction velocity drops sharply and at a concentration of about 70% sulfuric acid it is about $1/15$ what it was initially unless practically insoluble element such as iodine is employed as the activating element. By using iodine as the activating additive, the allowable or suitable upper limit of sulfuric acid concentration is significantly raised and increased to about 70% $H_2SO_4$.

The activity of the adsorbent used therefore depends mainly on the amount of activating additive present, but also on operating temperatures and sulfuric acid concentration.

The velocity at which the starting gas is passed through and in contact with the adsorbent depends, among other things, on the $SO_2$ content of the starting gas. When using a fixed catalyst bed, it also depends on the height of the bed. Under otherwise equal conditions, for example, when the $SO_2$ content of the starting gas increases from 1 g./m.$^3$ to 3 g./m.$^3$ the reaction velocity must increase 1.55 to 1.735 times. While this demonstrates that the relation velocity to $SO_2$ content of the starting gas is not linear, the height of the bed does have a direct linear relation to velocity.

In general it is possible under preferred reaction conditions, employing iodine as the activating element, and using a fixed catalyst bed having a diameter of about 3 meters, a height of about 1 meter and a carbon adsorbent having a particle size of about 2 to 8 mm., to pass the gas to be treated through the catalyst bed at about 3000 to 6000 m.$^3$/hr.

The grain size or particle size of the adsorbent, and its surface area, also affect the rate of reaction. It is advantageous to employ an adsorbent having a small particle size. Where the process employs a wet adsorbent, e.g., in the case where water for extraction of sulfuric acid produced is continuously trickled or sprayed onto the adsorbent, each particle of the adsorbent acts toward the gas treated like a drop of water or dilute sulfuric acid having a solid core. Since the oxidation process proceeds entirely at the adsorbent itself, the $SO_2$ and oxygen must first be taken up by the water and diffused through the water to the adsorbent. Since the manner of diffusion determines reaction time, it is believed that only the outer surface of the adsorbent is effective. It is also believed that the diffusion of gas into the interior of the adsorbent grain is insignificant and that no significant reaction takes place within the particle due to the small pore diameter of the adsorbent. Consequently, for a given quantity of adsorbent the speed of reaction increases in proportion to the area of the outer surface of the adsorbent particles. Since with spherical particles the relation of surface area to volume varies in direct proportion to the diameter of the grain, the speed of reaction too is proportional to adsorbent grain diameter. For example, under otherwise equal conditions a given quantity of adsorbent having a particle size of 3 millimeters can produce twice as much sulfuric acid per unit of time than can the same adsorbent with a particle size of 6 millimeters.

While it is advantageous to select the smallest possible particle size for the adsorbent, in a fixed bed reactor the lower limit of suitable particle size is determined by the resistance of the bed to passage of gases therethrough. This resistance increases with decrease in particle size of the adsorbent. With very small particle size it is necessary to use a suspension of the adsorbent in water or dilute sulfuric acid. Where such a suspension is employed it is necessary to separate the adsorbent from the sulfuric acid employed before concentration of the latter. But where larger grain adsorbents are employed the sulfuric acid produced can be subjected to concentration directly.

When using iodine as the catalytic element and a charred carbonaceous adsorbent in a fixed catalyst bed it is suitable that the adsorbent have a particle size of about 2 to 8 millimeters, and preferably 3 to 6 millimeters.

The process of the invention may be employed in a system illustrated in the accompanying drawing wherein The figure is a schematic flow diagram of a system suitable for the process of the invention.

As illustrated in the drawing the hot starting gases containing $SO_2$ at a temperature of about 120° to 185° C. are fed into the system through line 1. In the case of starting gases obtained from combustion of fuel oil the gases usually have a dew point of about 40 to 45° C. and an $SO_2$ content of about 3 to 10 g./m.³ (S.T.P.). The starting gases pass into cooler-concentrator 2. Relatively cool $H_2SO_3$, e.g., about 55% $H_2SO_4$, is then introduced through line 3 and sprayer 15 into cooler-concentrator 2. The cooled and humidified gas is then passed through line 4 to reactor 5. Water is sprayed into the reactor through sprayer 6. The catalyst bed 5a suitably comprises a carbonaceous adsorbent containing an activating element or compound as set out above. A preferred catalyst bed comprises activated carbon as the adsorbent having a particle size of about 3 to 6 millimeters and containing about 2 weight percent iodine as the activating element. The amount of catalytic element in or on the adsorbent is maintained at a catalytic level by means not shown. Diluted acid with a concentration of about 10% is taken off through line 13 and mixed with relatively concentrated acid of about 60% from line 16. The gas, from which substantially all the $SO_2$ has been removed, is passed from reactor 5 through line 7, at a temperature of about 40–70° C., and passed into heater-drier 8. In heater-drier 8 the gas from reactor 5 is heated by intimate direct contact with part of the concentrated $H_2SO_4$ collected from cooler-concentrator 2. This $H_2SO_4$ is passed through line 11 and sprayer 12 into heater-drier 8. Hot $H_2SO_4$ at a concentration of about 75% is withdrawn from the system through line 10 and dry product gas, free of $SO_2$, is exhausted to the atmosphere through line 9.

Another advantage of this embodiment of the invention is that all undesirable amounts of organic impurities in the hot starting gas, e.g., in, for example, a gas from a fuel oil combustion system or a roasting or blast furnace, are chemically decomposed upon contact with the sulfuric acid in the initial cooler-concentrator.

The invention is further described and illustrated with reference to the following examples. Percentages used in the specification and claims are by weight unless otherwise specified.

*Example 1*

A cylindrical reactor having a perforated bottom support was charged with a layer of formed active carbon particles, each about 4 mm. in diameter and about 6 mm. long. The layer was 650 mm. high and contained 32 kg. of active carbon. A nozzle was positioned above the carbon for spraying the active carbon with water. A flue gas or exhaust gas containing 2.5 to 4 g. $SO_2$, 0.8 to 1.2 g. $H_2SO_4$ and 0.6 to 0.8 g. $SO_3$ per cubic meter was passed through the active carbon. The oxygen content of the gas was about 6%. The water content of the gas was raised to a dew point of 52 to 60° C. by the addition of water vapor.

The temperature of the gas was about 170° C.

Based on the amount of gas passed through the catalyst bed 99.1 to 99.4% of the $SO_2$ originally present was converted, that is, the purified product gas contained no more than 20 to 25 mg. of $SO_2$ per cubic meter of gas. ⅔ to ¾ of the $H_2SO_4$ and $SO_3$ were likewise separated.

After an operating time of four months under the above conditions the amount of $H_2SO_4$ being produced was about 34 metric tons of $H_2SO_4$ (100%) per year per metric ton of active carbon.

Then small pieces of iron were placed on the upper surface of the active carbon. Within 6 hours the effectiveness or activity of the active carbon increased to about 56 metric tons of $H_2SO_4$ per year per metric ton of active carbon.

After one week the pieces of iron were replaced with pieces of copper. As a result the activity of the active carbon increased to about 96 metric tons of $H_2SO_4$ per metric ton of active carbon per year.

Similar tests in laboratory scale apparatus showed that vanadium has a somewhat higher effect than copper. Vanadium produces activity corresponding to production of about 98 metric tons of $H_2SO_4$ per year per metric ton of active carbon.

*Example 2*

Flue gas, from combustion of heavy fuel oil, at a temperature of 140 to 180° C. and having an $SO_2$ content of about 3 g./m.³ was employed as the gas to be purified. The flue gas was first cooled to 55 to 60° C. by direct contact with cool dilute $H_2SO_4$ and thereby nearly saturated with water before passage into the reactor. The cooled gas saturated with water was fed into a quadratic reactor having a horizontal gas passage and two successive perpendicular catalyst layers. The first layer consisted of incompletely burned or charred brown coal or lignite and was about 300 mm. thick. The second layer was about 420 mm. thick and consisted of formed pieces or granules of active carbon which had a diameter of about 0.8 mm. and a length of about 4 mm. The first layer contained about 1000 kg. of coke and the second layer about 1000 kg. of active carbon. The reactor was charged with up to 2000 cubic meters (S.T.P.) of flue or exhaust gas per hour. Both layers at the beginning of the test were sprayed with fresh water in which 20 to 50 g./m.³ of heavy metal salts were dissolved. The heavy metal additive was in the form of an aqueous solution which was separated from a liquid electrolyte of an electrolytic copper refining cell. Typical analysis of this solution shows the following amounts of components present.

|  | G./l. |
|---|---|
| Cu | 38.8 |
| Ni | 10.2 |
| As | 2.2 |
| Sb | 0.35 |
| Cl | 0.046 |
| $H_2SO_4$ (free) | 192 | and small amounts of Fe, Mn, Zn, Bi, Mg, Ca, Na and other cations.

The acid running off from both layers was recycled in two recycle lines back to the two layers. 75 liters/hr. of fresh water was added in the recycle to the second layer. A like amount of acid from the recycle of the second layer was added to the recycle of the first layer and the same amount of acid was drawn off as a product from the discharge of the first layer. The concentration of this acid drawn off as a product varied or fluctuated during the test between 8 and 21% $H_2SO_4$. The duration of the test was three months. During the entire time of operation no $SO_2$ could be detected in the exhaust gas with iodine.

After three months of operation the addition of the activity increasing additive, which consisted basically of copper and arsenic, was discontinued. As a result, after about 5 days, the $SO_2$ content of the exhaust gas increased to over 200 mg./m.³ (S.T.P.). Renewed addition of the activity increasing material in an amount of about 20 to 50 g./m.³ to the fresh water resulted within 24 hours in production of product exhaust gases having a purity corresponding to that obtained originally.

*Example 3*

The brown coal coke or charred carbon set out in Example 2 was tested in laboratory scale apparatus. 150 grams of this adsorbent was used to treat the gas as set out in Example 1. When 300 l./hr. of the gas was passed through the adsorbent 24% of the $SO_2$ was converted; but, after three days only 9% of the $SO_2$ was converted. By means of addition of copper to the water sprayed onto the adsorbent the conversion increased to about 42%, that is, about five times.

*Example 4*

Flue gas, containing about 4 g./m.³ (S.T.P.) of $SO_2$, from the combustion of heavy fuel oil, and at a temperature of about 180° C. was treated initially by washing and cooling the gas in a countercurrent washer or scrubber, e.g., cooler-concentrator 2 illustrated in the figure. The gas was thereby cooled to about 70° C. and humidified in the washer or scrubber. Each cubic meter of flue gas contained about 36 kilocalories of latent heat and was humidified with about 60 g. of water. The concentration of $H_2SO_4$ used to contact the gas increased to about 80% $H_2SO_4$ and the temperature of the acid increased to 138° C. The resulting gas had a dew point of 68° C., corresponding to a water content of 140 g./m.³ (S.T.P.). The gas from this stage was so completely free of organic impurities that none could be detected analytically.

The gas was then passed through an active carbon catalyst stage, e.g., reactor 5 of the figure, in which essentially all $SO_2$ present in the gas was converted to $H_2SO_4$. After several months of operation using as the activating additive, $SO_2$ was still not detectable in the exhaust gas.

*Example 5*

A charge or layer of active carbon 1 meter high was placed in a cylindrical reactor 600 millimeters in diameter. The carbon had been saturated with an alcoholic solution of iodine and dried at about 115° C. which charged or impregnated the carbon with 5 grams of iodine per liter.

A partial stream of 280 m.³/hr. (S.T.P.) of flue gas at a temperature of 62° C. from an oil fired steam boiler was passed through the layer of carbon. The gas contained 3.0 g./m.³ (S.T.P.) of $SO_2$, 0.115 g./m.³ (S.T.P.) $SO_3$, about 5% $O_2$ and 13% $CO_2$. 99.8% of the $SO_2$ portion and 60% of the $SO_3$ portion of the flue gas were removed by the active carbon composition.

By spraying the carbon during the process with 10 l. of water per hour, 10.7 l. per hour of 11.5% $H_2SO_4$ were collected at the bottom of the reactor.

This separated diluted acid was employed to cool the starting flue gas, which had a starting temperature of about 178° C. to about 70° C. and saturate the gas with water up to about 60%, before admission of the gas into the catalyst layer. A countercurrent column 470 mm. in diameter filled with packing to a height of 1500 mm. was employed for this purpose, e.g., cooler-concentrator 2 of the figure. The acid was thereby concentrated to 78%.

Only extremely small traces of iodine could be detected in the dilute acid taken off.

In a comparative test in which active carbon of the same quality was not treated with iodine, or any other substance, in the same apparatus described, only up to 72% of the $SO_2$ contained in the flue gas was separated.

*Example 6*

A partial stream of exhaust gas from a molybdenite roasting system was employed as the gas treated and passed through the test apparatus set out in Example 1. The gas was passed initially through an aqueous washing apparatus, but still contained 95 mg./m.³ $MoO_3$ dust, 0.8% $SO_2$ and 0.15% $SO_3$. The gas had a temperature of 53° C. and was saturated with water at this temperature. It was then fed to the reactor at a velocity of 124 m.³ per hour corresponding to a charge of 1.55 g. of $SO_2$/liter of carbon per hour. The active carbon was impregnated with 1% ammonium molybdate and was sprayed with a sufficient amount of water to cause the acid separated to have a concentration of 10% $H_2SO_4$. 98% of the $SO_2$ in the gas was removed.

In a comparative test using the same reaction conditions and apparatus the same amount of a second partial stream of gas having the same composition was passed through a filter which removed all of the dust from the gas. This removed all of the $MoO_3$. The gas was then passed through the reactor having a like active carbon layer. Up to 79% of the $SO_2$ was converted to $H_2SO_4$.

*Example 7*

A cylindrical reactor 250 mm. in diameter was filled with 10 liters of active carbon which had been saturated with an alcoholic solution of iodine and subsequently dried. After saturation the iodine content of the active carbon was about 12 g./l.

Subsequent 30 m.³ of exhaust gas from a contact apparatus containing 0.2% by volume $SO_2$ and 6% $O_2$ at a temperature of 45° C. was passed from top to bottom through the active carbon layer. The layer was maintained moist by spraying water onto the layer from above. 97.5% of the $SO_2$ was removed from the exhaust gas. The concentration of the acid taken off was 15%.

*Example 8*

The same procedure as in Example 7 was carried out using the same test apparatus as Example 7, the same amount of exhaust gas having the same composition, with the exception that the carbon was treated with a solution of potassium permanganate. Using this procedure the degree of $SO_2$ separation achieved was 84%.

*Example 9*

The same procedure as in Example 7 was carried out using the same test apparatus as in Example 7, the same amount of exhaust gas having the same composition, with the exception that the carbon was treated with potassium vanadate. The degree of $SO_2$ separation achieved was 78%.

Example 10

The same procedure as in Example 7 was carried out using the same test apparatus as in Example 7, the same amount of exhaust gas having the same composition, with the exception that the carbon was treated with zinc acetate. The degree of $SO_2$ separation achieved was 67%.

Example 11

The same procedure as in Example 7 was carried out using the same test apparatus as in Example 7, the same amount of exhaust gas having the same composition, with the exception that the carbon was treated with nickel carbonyl vapor. The degree of $SO_2$ separation achieved was 65%.

Example 12

The same procedure as in Example 7, was carried out using the same test apparatus as in Example 7, the same amount of exhaust gas having the same composition, with the exception that the carbon was treated with potassium dichromate. The degree of separation achieved was 59%.

I claim:

1. In a low temperature catalytic process for separating sulfur dioxide from a gas containing a minor proportion of sulfur dioxide, the steps comprising in combination contacting said gas at a temperature of about 20 to 100° C. with an excess of oxygen and water in the presence of a catalyst composition comprising a carbonaceous adsorbent impregnated with a catalytically effective amount of a catalytic member selected from the group consisting of manganese, copper, titanium, iron, zinc, nickel, cobalt, chromium, vanadium, molybdenum, tin, and their oxides; maintaining the concentration of said catalytic member per ton of carbonaceous adsorbent at a catalytically effective level during the entire process, and recovering product sulfuric acid.

2. A process as in claim 1 wherein the adsorbent is active carbon.

3. A process as in claim 1 wherein said temperature is about 40 to 70° C.

4. A process as in claim 1 wherein said catalytic level is maintained at about 100 to 5,000 grams of catalytic member per ton of adsorbent.

5. A process according to claim 1 wherein said process is carried out in a continuous manner.

6. In a low temperature catalytic process for separating sulfur dioxide from a starting gas containing a minor proportion of sulfur dioxide, the steps comprising in combination contacting said starting gas at a temperature of about 40-70° C. with an excess of oxygen and water in the presence of a catalyst composition comprising a carbonaceous adsorbent impregnated with a catalytically effective active amount of elemental iodine; maintaining the concentration of said iodine per ton of carbon adsorbent at a catalytically effective level during the entire process; recovering product sulfuric acid; and exhausting the resulting gas during up to 99.8% of the sulfur dioxide present in the starting gas removed.

7. In a low temperature catalytic process for separating $SO_2$ from a gas containing low concentrations of $SO_2$, the steps comprising in combination contacting said gas at a temperature of about 20 to 100° C. with an excess of oxygen and water in the presence of a catalyst composition comprising a carbonaceous adsorbent impregnated with a catalytically active amount of iodine, which is about 1 to 3% by weight, maintaining the concentration of said iodine at said catalytically active amount, recovering product sulfuric acid, and exhausting the resulting gas.

8. In a low temperature catalytic process for removing $SO_2$ from an exhaust gas containing about 2.5 to 4 grams $SO_2$ and about 5–6% oxygen per cubic meter and production of sulfuric acid, the steps comprising in combination contacting said exhaust gas at a temperature of about 20 to 100° C. with an excess of water in the presence of a catalyst composition comprising a carbonaceous adsorbent impregnated with a catalytically active amount of iodine, which is about 1–3% by weight, maintaining the concentration of said iodine at said catalytically active amount, exhausting the resulting gas with more than 99% of the said $SO_2$ removed, and recovering product sulfuric acid having a concentration of at least about 70%.

9. In a low temperature catalytic process for separating $SO_2$ from a gas containing low concentrations of $SO_2$, the steps comprising in combination contacting said gas at a temperature of about 20 to 100° C. with an excess of oxygen and water in the presence of a catalyst composition comprising a carbonaceous adsorbent impregnated with a catalytically effective amount of arsenic of between about 100 and 5000 grams per ton of adsorbent, maintaining the concentration of said arsenic at said catalytically effective amount, recovering product sulfuric acid, and exhausting the resulting gas.

10. In a low temperature catalytic process for separating sulfur dioxide from a gas containing a minor proportion of sulfur dioxide, the steps comprising in combination contacting said gas at a temperature of about 20 to 100° C. with oxygen and water in the presence of a catalyst composition comprising a carbonaceous adsorbent impregnated with a catalytically effective amount of iodine which is about 0.1 to 5% by weight of the carbonaceous adsorbent, maintaining the concentration of said iodine at said catalytically effective amount and recovering product sulfuric acid.

References Cited by the Examiner

FOREIGN PATENTS

| | | |
|---|---|---|
| 854,205 | 8/1952 | Germany. |
| 1,139,817 | 11/1962 | Germany. |
| 43,279 | 8/1960 | Poland. |

OTHER REFERENCES

Copson, et al.: Industrial and Engineering Chemistry, vol. 25, No. 8, pp. 909–916 (1933).

Deitz: Bibliography of Solid Adsorbents, 1910–1942, p. 698, No. 5213.

Duecker et al.: The Manufacture of Sulfuric acid (1959), pp. 219–2.

OSCAR R. VERTIZ, *Primary Examiner.*

BENJAMIN HENKIN, *Examiner.*

R. M. DAVIDSON, A. J. GREIF, *Assistant Examiners.*